US012591483B2

(12) United States Patent
Dodds et al.

(10) Patent No.: US 12,591,483 B2
(45) Date of Patent: Mar. 31, 2026

(54) SYSTEM AND METHOD FOR PROTECTING DATA

(71) Applicant: Microsoft Technology Licensing, LLC, Redmond, WA (US)

(72) Inventors: Brett K. Dodds, Boise, ID (US); Terry M. Grunzke, Boise, ID (US); Majid Anaraki Nemati, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/595,177

(22) Filed: Mar. 4, 2024

(65) Prior Publication Data

US 2025/0278331 A1     Sep. 4, 2025

(51) Int. Cl.
*G06F 11/10*          (2006.01)

(52) U.S. Cl.
CPC ...... *G06F 11/1068* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 8,549,382 B2 * | 10/2013 | Motwani | ............ | H03M 13/1102 714/763 |
| 11,050,437 B1 * | 6/2021 | Patel | ..................... | H04L 1/0059 |
| 12,038,809 B1 * | 7/2024 | Zhang | ................. | G06F 11/1012 |
| 2008/0163033 A1 * | 7/2008 | Yim | ...................... | H03M 13/15 714/E11.034 |
| 2008/0168320 A1 | 7/2008 | Cassuto | | |
| 2008/0195890 A1 | 8/2008 | Earhart | | |
| 2013/0080862 A1 | 3/2013 | Bennett | | |
| 2019/0294499 A1 * | 9/2019 | Yang | .................... | G11C 29/028 |
| 2021/0055868 A1 | 2/2021 | Basu | | |
| 2022/0291838 A1 * | 9/2022 | Gorobets | ............. | G06F 3/0673 |
| 2024/0004756 A1 | 1/2024 | Mccrate | | |
| 2024/0086277 A1 * | 3/2024 | Tang | ................. | G06F 11/1004 |
| 2024/0128985 A1 * | 4/2024 | Jun | .................... | H03M 13/1174 |
| 2025/0123922 A1 * | 4/2025 | Asadi | ................. | G06F 11/1048 |

OTHER PUBLICATIONS

J. -H. Lee, "CRC (Cyclic Redundancy Check) Implementation in High-Speed Semiconductor Memory," 2015 8th International Conference on Control and Automation (CA), Jeju, Korea (South), 2015, pp. 17-20, (Year: 2015).*
Non-Final Office Action mailed on Jan. 6, 2026, in U.S Appl. No. 18/934,144, 10 pages.

* cited by examiner

*Primary Examiner* — Daniel F. McMahon

(57)          ABSTRACT

A computer-implemented method for decoding encoded data. The encoded data includes core data and parity data. The parity data is based, at least in part, upon the core data. Decoding the encoded data may confirm the integrity of the encoded data. Decoding the encoded data includes: generating a failure mask based, at least in part, upon the encoded data. If the failure mask indicates data corruption, the computer-implemented method includes performing an XOR-based trial process to compare the failure mask to a plurality of portions of the encoded data to locate the data corruption.

20 Claims, 8 Drawing Sheets

100

100

SYSTEM AND METHOD FOR PROTECTING DATA

TECHNICAL FIELD

This disclosure relates to systems and methods for protecting data and, more particularly, to systems and methods for protecting data and metadata within memory.

BACKGROUND

Ensuring the integrity of data within memory modules is crucial for the overall stability and reliability of computing systems. One common method to safeguard data integrity is the use of Error Correcting Code (ECC) memory. ECC memory can detect and correct common types of data corruption, thereby preventing errors that could lead to system crashes or data loss. This is particularly important in server environments and critical applications where data integrity is paramount. Another technique involves implementing on-die ECC, where error correction happens within the memory chip itself, providing an additional layer of protection by correcting errors that occur within the memory module before they reach the external ECC. Memory controllers also play a vital role in maintaining data integrity by managing data flow to and from the memory modules and can implement various error-checking mechanisms. Additionally, advanced memory modules incorporate features like CRC (Cyclic Redundancy Check) for error checking on communication commands and data, and Parity checking for command and address lines to ensure that the data sent to and from the memory is correct.

BRIEF DESCRIPTION OF THE DRAWINGS

Like reference symbols in the various drawings indicate like elements.

DETAILED DESCRIPTION OF THE PREFERRED EMBODIMENTS

As will be discussed below in greater detail, implementations of the present disclosure are configured to enable the protection of data stored within memory. Specifically, implementations of the present disclosure utilize a combination of CRC encoding and XOR encoding to provide data protection for data stored within memory modules.

The details of one or more implementations are set forth in the accompanying drawings and the description below. Other features and advantages will become apparent from the description, the drawings, and the claims.

Figure 1:
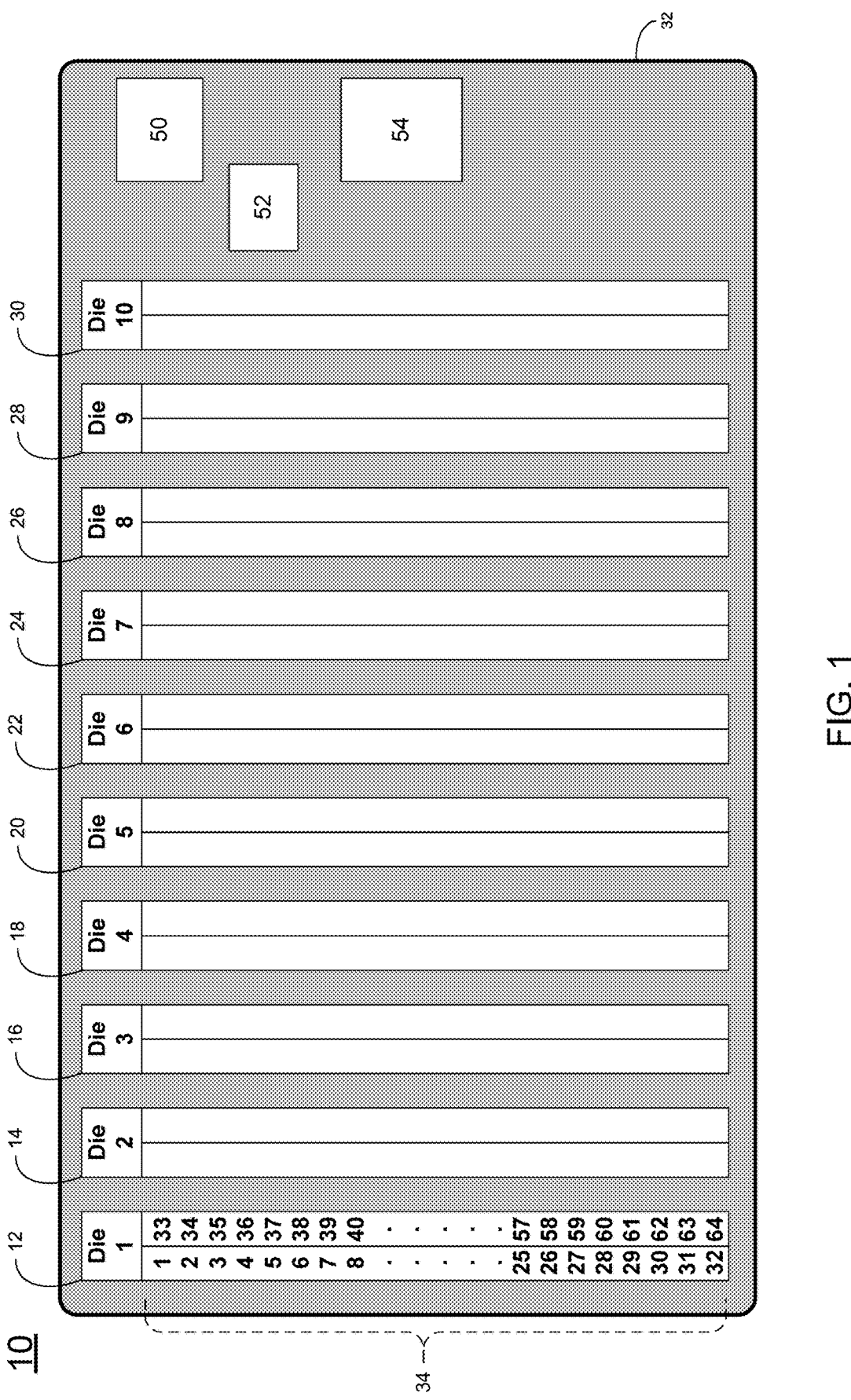
FIG. 1 is a diagrammatic view of memory.

Memory Modules:

Referring to FIG. 1, there is shown memory module 10. Memory module 10 is a type of computer memory technology that is used in high-performance computing systems, including desktop computers, server computers, and graphics cards. Examples of the memory module (e.g., memory module 10) may include but are not limited to: a DDR 4 memory module; a DDR 5 memory module; and a DDR 6 memory module, as well as other forms of non-DDR memory.

DDR4 memory is a type of RAM (Random Access Memory) introduced in 2014, succeeding DDR3. It is designed for use in computers and servers to provide faster data transfer rates and greater efficiency compared to its predecessors. DDR4 operates at a lower voltage of 1.2V, reducing power consumption and heat generation, while offering higher data transfer speeds and increased capacity. The standard speed of DDR4 memory starts at 2133 MHz, significantly faster than DDR3's starting speed, and it can reach speeds beyond 3200 MHZ with overclocking. This improvement enhances overall system performance, allowing for smoother operation, especially in memory-intensive applications and multitasking environments. DDR4 also introduces a modified memory chip density and a different DIMM (dual in-line memory module) slot design for improved physical compatibility and reliability, making it an essential component in modern computing systems for both everyday and professional use.

DDR5 memory represents the latest advancement in Double Data Rate (DDR) technology, succeeding DDR4. Launched to the market around 2020, DDR5 aims to significantly improve upon its predecessor by offering higher data transfer rates, increased capacity, and greater efficiency. Operating at a base speed much higher than DDR4, DDR5 memory starts at speeds around 4800 MHz and has the potential to reach speeds far beyond, substantially enhancing system performance. This improvement is crucial for data-intensive applications and emerging technologies that demand faster data processing and larger bandwidths. DDR5 also operates at a lower voltage than DDR4, further reducing power consumption and heat output, which is particularly beneficial in dense server environments and for energy-conscious consumers. Additionally, DDR5 introduces innovative features such as on-die ECC (Error Correcting Code) for improved data reliability and dual-channel architecture within a single module, enabling better utilization of available bandwidth. These advancements make DDR5 a pivotal development in memory technology, poised to support the next generation of computing needs across various sectors, including gaming, professional workstations, and enterprise servers.

DDR6 memory had not been officially released or detailed by leading industry standards organizations. The progression from DDR4 to DDR5 set significant benchmarks in terms of speed, efficiency, and performance improvements for memory technology. Given this trajectory, DDR6 would hypothetically represent a further advancement in these areas, aiming to provide even higher data transfer rates, greater efficiency, and larger capacity options compared to DDR5. It would likely focus on addressing the evolving demands of high-performance computing, advanced gaming, data analytics, and AI applications by offering lower power consumption, improved error correction features, and enhanced bandwidth capabilities. Additionally, DDR6 might introduce new architectural enhancements to further optimize data throughput and reliability in complex systems. However, without official specifications or announcements regarding DDR6, any discussions about its features or capabilities remain speculative and are based on the anticipated needs of future computing technologies and the historical trend of generational improvements in memory technology.

Non-DDR memory encompasses various types of computer memory technologies that predate or operate differently from Double Data Rate (DDR) memory, which enhances data transfer speed by performing two operations per clock cycle. Before DDR became the norm, computers relied on Synchronous Dynamic RAM (SDRAM) for their memory needs; SDRAM operated synchronously with the CPU clock but was limited to one operation per cycle, unlike its DDR successors. Other forms of non-DDR memory included Extended Data-Out Dynamic RAM (EDO RAM) and Fast Page Mode RAM (FPM RAM), both improvements over earlier dynamic RAM technologies by facilitating quicker data access under certain conditions. Additionally, Static RAM (SRAM) falls under the non-DDR category, known for its speed and efficiency due to not needing refresh cycles like dynamic RAM, though it's mainly used for cache memory in CPUs and hard drives due to its higher cost.

In some implementations, memory module 10 includes ten dies (e.g., dies 12, 14, 16, 18, 20, 22, 24, 26, 28, 30). For example, these ten dies (e.g., dies 12, 14, 16, 18, 20, 22, 24, 26, 28, 30) may be ten dies per rank per sub-channel. In the context of memory module 10, a "die" refers to a discrete silicon chip that is part of memory module 10. Memory modules are typically constructed using multiple memory dies (e.g., dies 12, 14, 16, 18, 20, 22, 24, 26, 28, 30) that are integrated onto a single circuit board (e.g., circuit board 32).

A memory die may contain the memory cells, sense amplifiers, and other necessary components that enable data storage and retrieval. Each die (e.g., dies 12, 14, 16, 18, 20, 22, 24, 26, 28, 30) is organized into multiple banks, which are further divided into rows and columns of memory cells. The memory cells store binary data in the form of electrical charges, which are read and written using the sense amplifiers and other circuitry on the die.

Memory dies (e.g., dies 12, 14, 16, 18, 20, 22, 24, 26, 28, 30) in memory modules are typically manufactured using advanced semiconductor fabrication processes, which involve the deposition and patterning of multiple layers of materials on a silicon substrate. These processes allow for the miniaturization of the memory cells and other components, which in turn enables higher memory capacities, faster data transfer rates, and improved power efficiency.

Multiple memory dies (e.g., dies 12, 14, 16, 18, 20, 22, 24, 26, 28, 30) are typically used in a single memory module (e.g., memory module 10) to achieve higher overall memory capacity. These dies (e.g., dies 12, 14, 16, 18, 20, 22, 24, 26, 28, 30) are often connected in parallel and controlled by a memory controller (not shown), which coordinates their operations and manages the flow of data between memory module 10 and the rest of the system (not shown). This memory controller (not shown) may be a portion of a CPU (not shown) or an off-module device, such as a CXL controller (not shown). The number of memory dies (e.g., dies 12, 14, 16, 18, 20, 22, 24, 26, 28, 30) in a memory module (e.g., memory module 10) depends on the desired capacity and performance characteristics of the module.

Each of the ten dies (e.g., dies 12, 14, 16, 18, 20, 22, 24, 26, 28, 30) included within memory module 10 may include sixty-four data storage bits (e.g., data storage bits 34).

Figure 2:
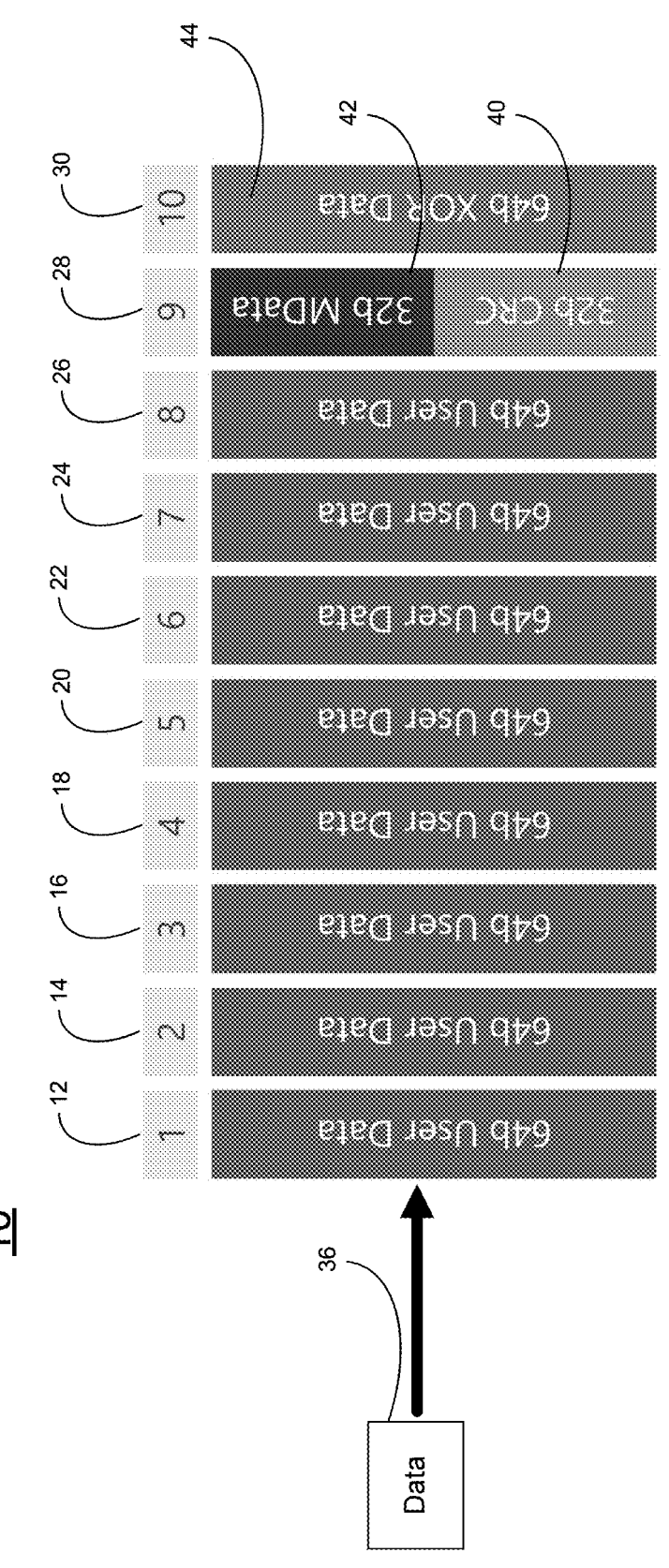
FIG. 2 is another diagrammatic view of memory.

Referring also to FIG. 2, memory module (e.g., memory module 10) may be used to store core data (e.g., data 36), wherein data 36 may be distributed amongst some or all of the ten dies (e.g., dies 12, 14, 16, 18, 20, 22, 24, 26, 28, 30) included within memory module 10. For this example, assume that the core data (e.g., data 36) is 512 bits of data, wherein 64 bits of this core data (e.g., data 36) are stored on each of eight dies (e.g., dies 12, 14, 16, 18, 20, 22, 24, 26). Accordingly and in this example, the remaining two dies (e.g., dies 28, 30) contain no data.

Figure 3:
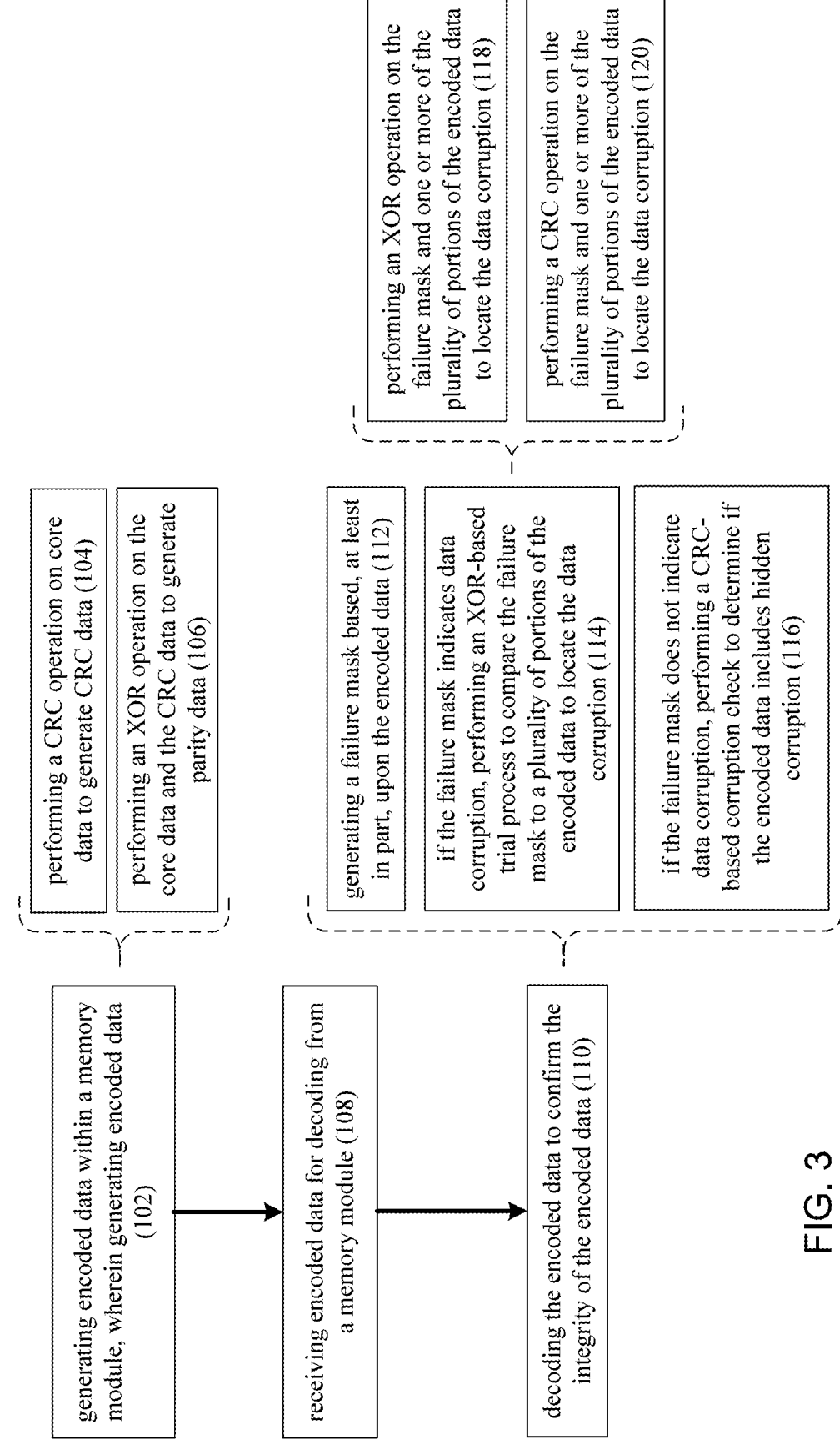
FIG. 3 is a flow chart of an implementation of a data protection process according to an embodiment of the present disclosure.
Figure 4:
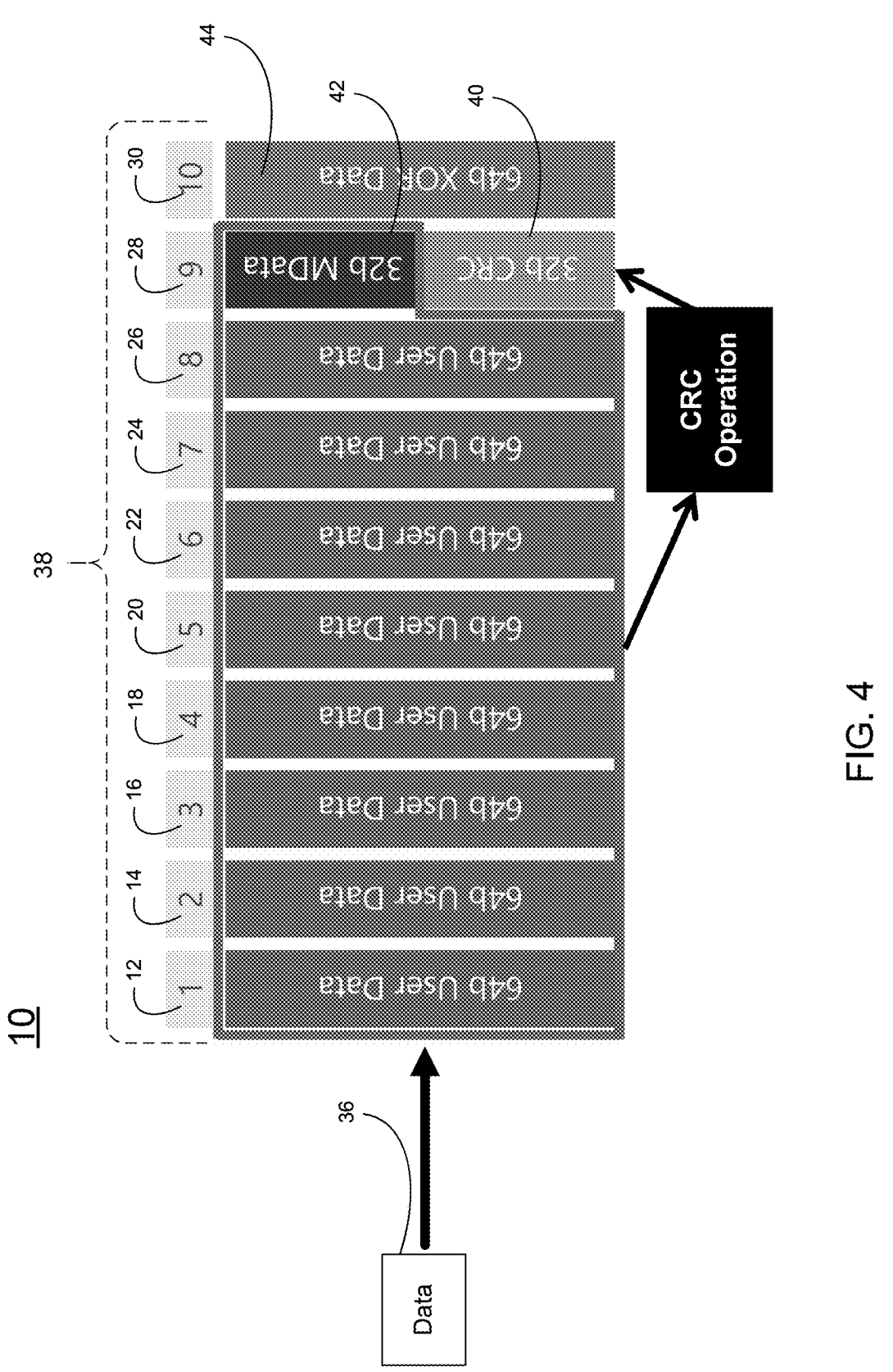
FIG. 4 is another diagrammatic view of memory and an implementation of the data protection process of FIG. 3.

Data Encoding:

Referring also to FIGS. 3-4, data protection process 100 may generate 102 encoded data (e.g., encoded data 38) within a module (e.g., memory module 10). As will be discussed below in greater detail, once the core data (e.g., data 36) is encoded by data protection process 100, the encoded data (e.g., encoded data 38) generated 102 will be protected from being corrupted (as any corruption will be determinable by data protection process 100). As will also be discussed below in greater detail, the encoded data (e.g., encoded data 38) may include: core data (e.g., data 36), and parity data based, at least in part, upon the core data (e.g., data 36).

When generating 102 such encoded data (e.g., encoded data 38), data protection process 100 may perform 104 a CRC operation on the core data (e.g., data 36 stored within dies 12, 14, 16, 18, 20, 22, 24, 26) to generate the CRC value (e.g., CRC value 40). Accordingly, the encoded data (e.g., encoded data 38) may include CRC value (e.g., CRC value 40) that is based, at least in part, upon the core data (e.g., data 36)

A Cyclic Redundancy Check (CRC) is a widely used method for detecting errors in digital data. It operates by applying a mathematical algorithm to the data block to generate a short, fixed-size binary sequence, often referred to as the "checksum" or "CRC value" (e.g., CRC value 40). This value (e.g., CRC value 40) is then sent or stored along with the data (e.g., data 36 stored within dies 12, 14, 16, 18, 20, 22, 24, 26). When the data (e.g., data 36 stored within dies 12, 14, 16, 18, 20, 22, 24, 26) is read or received, the CRC operation is performed again, and the newly calculated CRC value is compared to the original one. If the two values match, it is assumed that the data (e.g., data 36 stored within dies 12, 14, 16, 18, 20, 22, 24, 26) has not been altered; if they do not match, it indicates that the data (e.g., data 36 stored within dies 12, 14, 16, 18, 20, 22, 24, 26) may have been corrupted during transmission or storage.

CRCs are highly effective for detecting common types of errors, example of which may include but are not limited to single-bit errors and burst errors. CRCs are extensively used in various applications, such as data transmission protocols, data storage, and within file formats . . . to ensure the integrity of data. The strength and reliability of CRC depend on the specific polynomial used in the algorithm, with different applications opting for different polynomials tailored to their error detection requirements.

This CRC value (e.g., CRC value 40) may be stored within some or all of die 28 of memory module 10), wherein the size of the CRC value (e.g., CRC value 40) may be increased or decreased depending upon the level of resolvability desired with respect to corruption. In this particular example, the CRC value (e.g., CRC value 40) is shown to be 32 bits, thus leaving half of die 28 of memory module 10 available for storing other data (to be discussed below).

The ability of a Cyclic Redundancy Check (CRC) to detect errors in data improves as the size of the CRC increases. This enhancement in corruption resolution is due to the way CRC operates. It works by generating a short, fixed-size binary sequence, known as a CRC code (e.g., CRC value 40), from a block of data (e.g., data 36 stored within dies 12, 14, 16, 18, 20, 22, 24, 26) primarily using polynomial division. The key principle behind CRC's effectiveness in detecting errors lies in the properties of the polynomial used, which directly correlates with the size of the CRC (e.g., CRC value 40).

As the CRC size increases, it corresponds to using a longer polynomial, which in turn provides a more extensive range of possible CRC codes. A larger set of codes means that the CRC can represent a wider variety of data block states, making it more sensitive to changes in the data. This sensitivity allows it to detect smaller and more complex errors that might occur during transmission. For example, while a smaller CRC might only effectively detect single-bit errors or small error bursts, a larger CRC can identify more intricate patterns of errors, including double-bit errors, odd numbers of bit errors, or larger bursts of noise, with a higher probability of detecting multiple error scenarios that could be missed by a shorter CRC.

Furthermore, the probability of two different data blocks yielding the same CRC code (a situation known as a collision) decreases as the CRC size increases. This reduced collision risk enhances the overall reliability of data transmission, ensuring that errors are less likely to go undetected. However, the trade-off for this increased error detection capability is the need for more processing power and potentially more transmission bandwidth to accommodate the larger CRCs. Balancing the size of the CRC with the operational constraints and error detection requirements of a specific application is crucial for optimizing performance and reliability.

As discussed above, the CRC value (e.g., CRC value 40) is shown in this example to be 32 bits. And since the size of the CRC value (e.g., CRC value 40) may be increased or decreased depending upon the level of resolvability desired with respect to corruption, a portion of die 28 of memory module 10 may be available for storing other types of data. Since the core data may include metadata (e.g., metadata 42), such metadata (e.g., metadata 42) may be stored within the unoccupied portion of die 28 of memory module 10. Accordingly and in this example, such metadata (e.g., metadata 42) may be 32 bits and may occupy half of die 28.

In the event that the core data includes metadata (e.g., metadata 42), when data protection process 100 performs 104 the CRC operation on the core data (e.g., data 36 stored within dies 12, 14, 16, 18, 20, 22, 24, 26) to generate the CRC value (e.g., CRC value 40). data protection process 100 may consider metadata 42 (stored within half of die 28) in addition to the data stored within dies 12, 14, 16, 18, 20, 22, 24, 26 when calculating the CRC value (e.g., CRC value 40).

Figure 5:
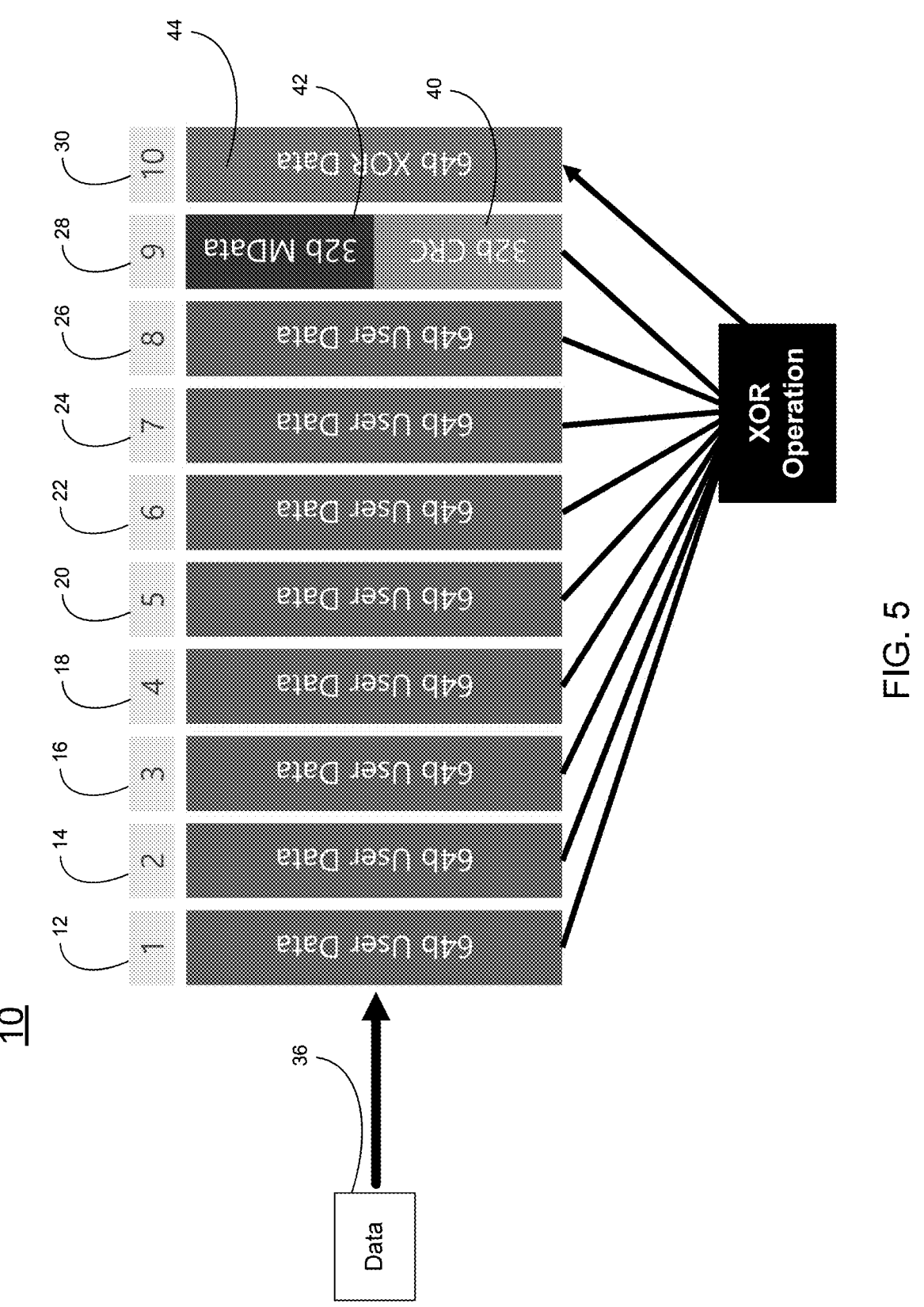
FIG. 5 is another diagrammatic view of memory and an implementation of the data protection process of FIG. 3.

Referring also to FIG. 5, when generating 102 such encoded data (e.g., encoded data 38), data protection process 100 may perform 106 an XOR operation on the core data (e.g., data 36 stored within dies 12, 14, 16, 18, 20, 22, 24, 26) and the CRC value (e.g., CRC value 40) to generate parity data (e.g., parity data 44), wherein parity data 44 may be stored within die 30 of memory module 10. If the core data includes metadata (e.g., metadata 42), such metadata (e.g., metadata 42) may be considered when performing 106 the XOR operation An XOR (exclusive OR) operation is a fundamental binary operation frequently used in various applications in computer science and digital electronics. It compares two binary inputs, typically represented as bits, and produces a result based on their differences. The XOR operation returns a 1 if the two input bits are different, and a 0 if they are the same. This behavior makes XOR particularly useful for a range of tasks, including error detection and correction, data encryption, and logical operations within digital circuits.

One common application of XOR is in error detection and correction codes, such as CRC (Cyclic Redundancy Check). In CRC, an XOR operation is used to generate a checksum, which is appended to data before transmission. The recipient performs the same XOR operation on the received data, including the checksum, and compares the result to a predetermined value. If the two values match, it indicates that the data was likely transmitted without errors. If there is a discrepancy, it suggests that errors may have occurred during transmission.

Once the above-described procedures are implemented, the encoding of the core data (e.g., data 36) is completed (e.g., resulting in encoded data 38), thus protecting the core data (e.g., data 36) from corruption (as any corruption will be determinable by data protection process 100). Accordingly, such encoded data 38 may be e.g., stored/transmitted and (when subsequently retrieved/received) may be decoded by data protection process 100 to confirm that such encoded data 38 has not been corrupted.

Data Decoding:

As discussed above, "In CRC, an XOR operation is used to generate a checksum, which is appended to data before transmission. The recipient performs the same XOR operation on the received data, including the checksum, and compares the result to a predetermined value".

Figure 6:
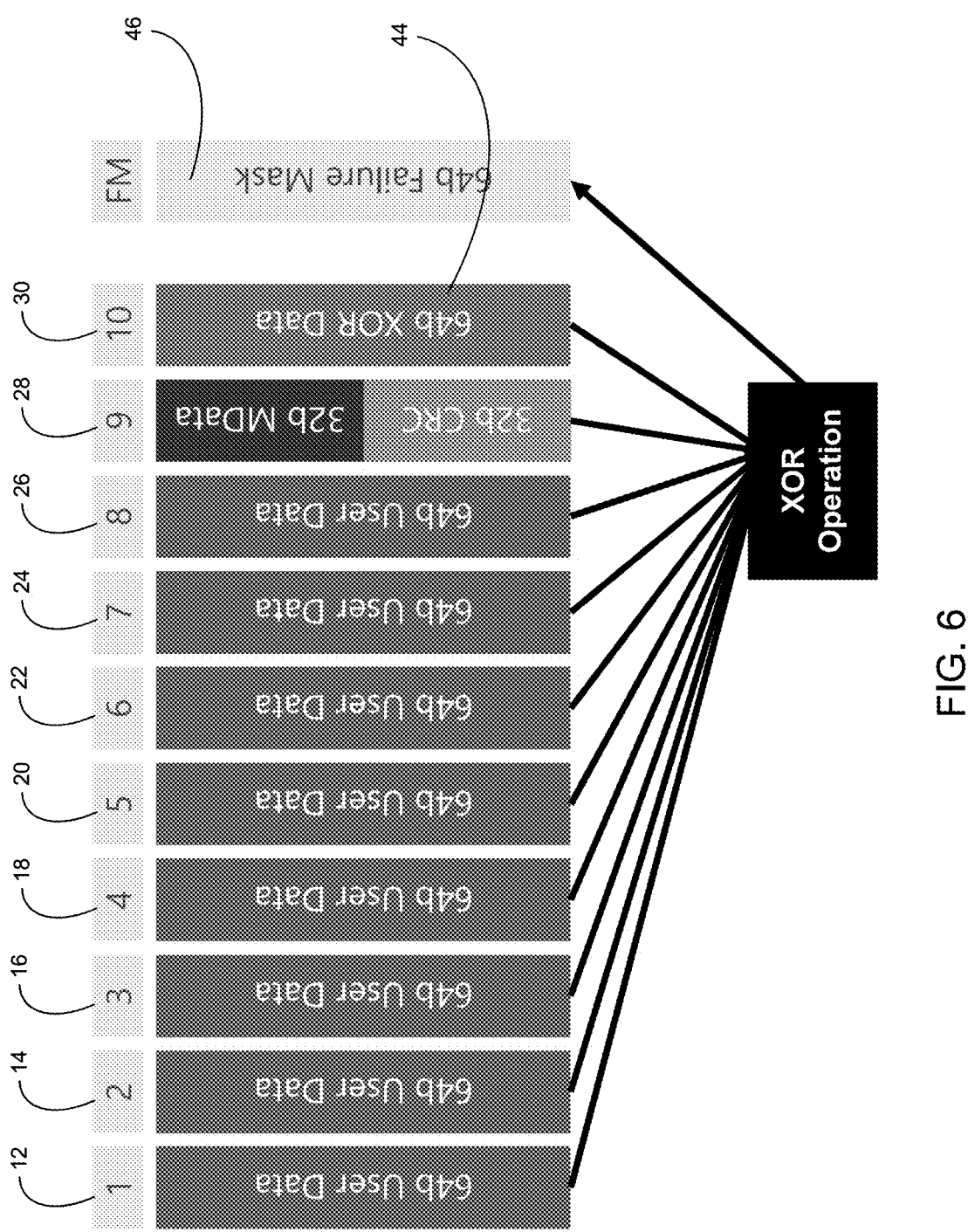
FIG. 6 is another diagrammatic view of memory and an implementation of the data protection process of FIG. 3.

Accordingly and referring also to FIG. 6, once the parity data (e.g., parity data 44) is stored within die 30 of memory module 10, data protection process 100 may analyze the integrity of encoded data 38 (e.g., the data stored within dies 12, 14, 16, 18, 20, 22, 24, 26, 28, 30) by performing an XOR operation on encoded data 38 (e.g., the data stored within dies 12, 14, 16, 18, 20, 22, 24, 26, 28, 30) to generate a failure mask (e.g., failure mask 46).

Such a failure mask (e.g., failure mask 46) may then be analyzed by data protection process 100 to determine the integrity of encoded data 38. As discussed above, "If the two values match, it indicates that the data was likely transmitted without errors. If there is a discrepancy, it suggests that errors may have occurred during transmission". Accordingly, if failure mask 46 matches parity data 44, encoded data 38 is likely corruption free. Conversely, if failure mask 46 does not match parity data 44, encoded data 38 is likely corrupted.

Accordingly, data protection process 100 may receive 108 encoded data (e.g., encoded data 38) for decoding from the memory module (e.g., memory module 10). Once received 108, data protection process 100 may decode 110 the encoded data (e.g., encoded data 38) to confirm the integrity of the encoded data (e.g., encoded data 38).

Continuing with the above-stated example, data protection process 100 may generate 112 the failure mask (e.g., failure mask 46) based, at least in part, upon the encoded data (e.g., encoded data 38). Once the failure mask (e.g., failure mask 46) is generated 112, the failure mask (e.g., failure mask 46) may be compared to the parity data (e.g., parity data 44) to determine the integrity of encoded data 38. Specifically:

if the failure mask (e.g., failure mask 46) indicates data corruption (i.e., does not match parity data 44), data protection process 100 may perform 114 an XOR-based trial process to compare the failure mask (e.g., failure mask 46) to a plurality of portions (e.g., the data stored within dies 12, 14, 16, 18, 20, 22, 24, 26, 28) of the encoded data (e.g., encoded data 38) to locate the data corruption (to be discussed below in greater detail).

if the failure mask (e.g., failure mask 46) does not indicate data corruption (i.e., matches parity data 44), data protection process 100 may perform 116 a CRC-based corruption check to determine if the encoded data (e.g., encoded data 38) includes hidden corruption (to be discussed below in greater detail).

Figure 7:
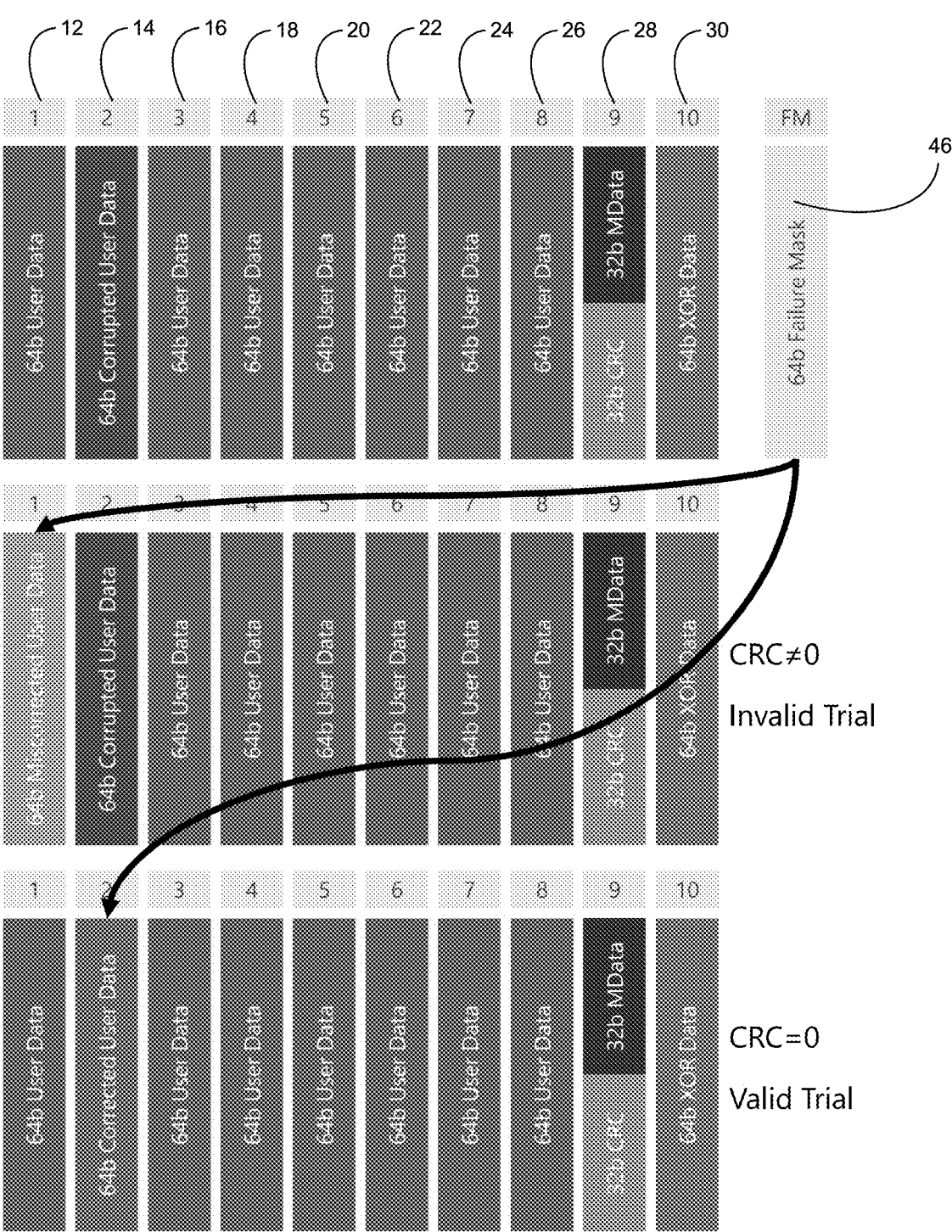
FIG. 7 is another diagrammatic view of memory and an implementation of the data protection process of FIG. 3.

Referring also to FIG. 7, when performing 114 an XOR-based trial process to compare the failure mask (e.g., failure mask 46) to a plurality of portions (e.g., the data stored within dies 12, 14, 16, 18, 20, 22, 24, 26, 28) of the encoded data (e.g., encoded data 38) to locate the data corruption, data protection process 100 may:

perform 118 an XOR operation on the failure mask (e.g., failure mask 46) and one or more of the plurality of portions (e.g., the data stored within dies 12, 14, 16, 18, 20, 22, 24, 26, 28) of the encoded data (e.g., encoded data 38) to locate the data corruption, and.

perform 120 a CRC operation on the failure mask (e.g., failure mask 46) and one or more of the plurality of portions (e.g., the data stored within dies 12, 14, 16, 18, 20, 22, 24, 26, 28) of the encoded data (e.g., encoded data 38) to locate the data corruption.

Specifically and with the failure pattern now known via the failure mask (e.g., failure mask 46), data protection process 100 may try correcting errors at each die position (via performing 118 an XOR operation and performing 120 a CRC operation) to locate the data corruption within the plurality of portions (e.g., the data stored within dies 12, 14, 16, 18, 20, 22, 24, 26, 28) of encoded data 38.

For example, data protection process 100 may:

XOR failure mask 46 with the data included in each of dies 12, 14, 16, 18, 20, 22, 24, 26, 28; and Check for a valid CRC, wherein:

a CRC of 1 indicate a mismatch between failure mask 46 and the data in the analyzed die . . . and therefore no data corruption, while a CRC of 0 indicate a match between failure mask 46 and the data in the analyzed die . . . and therefore data corruption.

Figure 8:
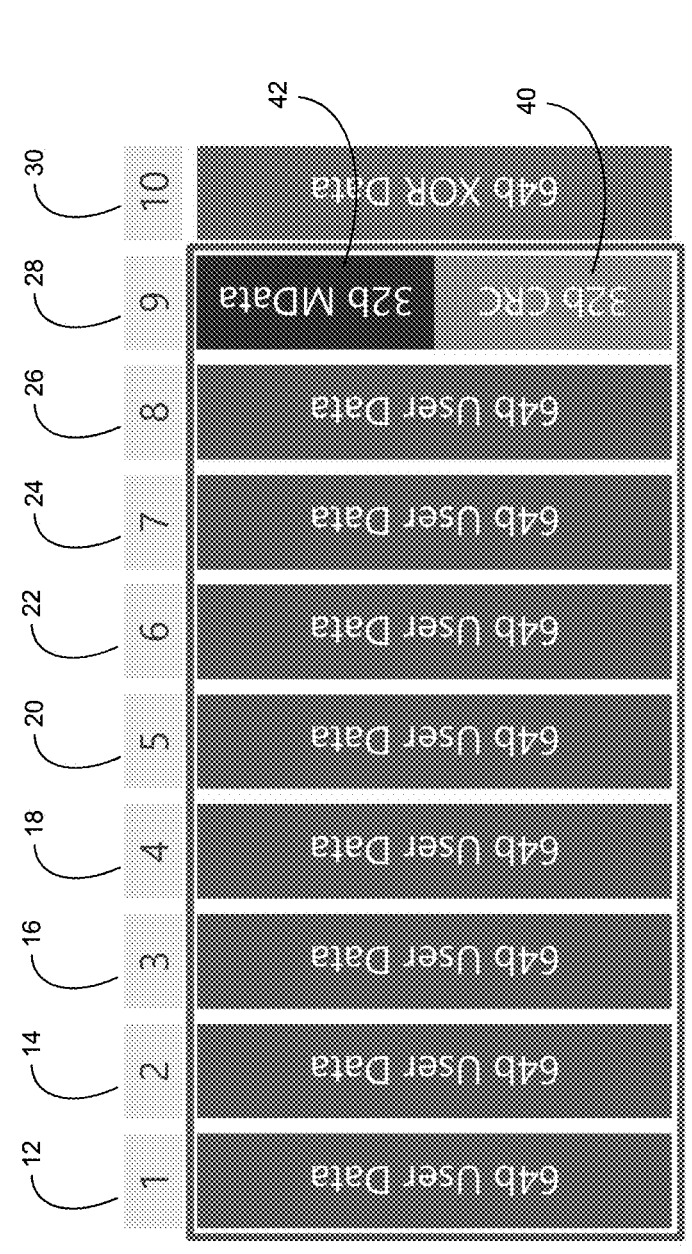
FIG. 8 is another diagrammatic view of memory and an implementation of the data protection process of FIG. 3.

Referring also to FIG. 8, when performing 116 a CRC-based corruption check to determine if the encoded data (e.g., encoded data 38) includes hidden corruption, data protection process 100 may recalculate a CRC value (e.g., for the data stored within dies 12, 14, 16, 18, 20, 22, 24, 26) and (if appropriate) metadata 42, resulting in recalculated CRC value 48).

Data protection process 100 may then compare recalculated CRC value 48 to the original CRC value (e.g., CRC value 40) included within encoded data 38, wherein:

a CRC of 0 indicate a match between recalculated CRC value 48 and the original CRC value (e.g., CRC value 40) . . . and therefore no data corruption, while a CRC of 1 indicate a mismatch between recalculated CRC value 48 and the original CRC value (e.g., CRC value 40) . . . and therefore data corruption System Overview:

In some implementations, data protection process 100 may be implemented as an entirely hardware embodiment, an entirely software embodiment (including firmware, resident software, micro-code, etc.) or an embodiment combining software and hardware aspects that may all generally be referred to herein as a "circuit," "module". "process" or "system.".

The instruction sets and subroutines of data protection process 100, which may be stored on storage device 50 coupled to memory module 10, may be executed by one or more processors (e.g., processor 52) and one or more memory architectures (e.g., memory architecture 54) included within memory module 10. Examples of memory architecture 54 may include but are not limited to: a random access memory (RAM); a read-only memory (ROM); and all forms of flash memory storage devices.

General:

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module", "process" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving encoded data for decoding from a memory module, wherein the encoded data includes:
   core data, and
   parity data based, at least in part, upon the core data; and
   decoding the encoded data to confirm integrity of the encoded data, wherein decoding the encoded data includes:
   generating a failure mask based, at least in part, upon performing a CRC operation on the core data and performing XOR operations on the core data and a result of the CRC operation, and
   if the failure mask does not match the parity data, performing an XOR-based trial process to compare the failure mask to a plurality of portions of the encoded data to locate data corruption.

2. The computer-implemented method of claim 1 wherein decoding the encoded data to confirm the integrity of the encoded data further includes:
   if the failure mask does not indicate data corruption, performing a CRC-based corruption check to determine if the encoded data includes corrupt data.

3. The computer-implemented method of claim 1 wherein the core data includes metadata.

4. The computer-implemented method of claim 1 wherein the encoded data includes CRC value based, at least in part, upon the core data.

5. The computer-implemented method of claim 1 wherein the plurality of portions of the encoded data were stored within a plurality of memory dies within the memory module.

6. The computer-implemented method of claim 1 wherein the memory module includes one of:
   a DDR 4 memory module;
   a DDR 5 memory module; and
   a DDR 6 memory module.

7. The computer-implemented method of claim 1 wherein performing an XOR-based trial process to compare the failure mask to a plurality of portions of the encoded data to locate the data corruption includes:
   performing an XOR operation on the failure mask and one or more of the plurality of portions of the encoded data to locate the data corruption.

8. The computer-implemented method of claim 7 wherein performing an XOR-based trial process to compare the failure mask to a plurality of portions of the encoded data to locate the data corruption further includes:

performing the CRC operation on one or more of the plurality of portions of the core data to locate the data corruption.

9. A computer program product residing on a computer readable medium having a plurality of instructions stored thereon which, when executed by a processor, cause the processor to perform operations comprising:

receiving encoded data for decoding from a memory module, wherein the encoded data includes:

core data, and parity data based, at least in part, upon the core data; and decoding the encoded data to confirm integrity of the encoded data, wherein decoding the encoded data includes:

generating a failure mask based, at least in part, upon performing a CRC operation on the core data and performing XOR operations on the core data and a result of the CRC operation, if the failure mask does not match the parity data, performing an XOR-based trial process to compare the failure mask to a plurality of portions of the encoded data to locate data corruption, and if the failure mask does not indicate data corruption, performing a CRC-based corruption check to determine if the encoded data includes corrupt data; and wherein the plurality of portions of the encoded data were stored within a plurality of memory dies within the memory module.

10. The computer program product of claim 9 wherein the core data includes metadata.

11. The computer program product of claim 9 wherein the encoded data includes CRC value based, at least in part, upon the core data.

12. The computer program product of claim 9 wherein the memory module includes one of:

a DDR 4 memory module;

a DDR 5 memory module; and a DDR 6 memory module.

13. The computer program product of claim 9 wherein performing an XOR-based trial process to compare the failure mask to a plurality of portions of the encoded data to locate the data corruption includes:

performing an XOR operation on the failure mask and one or more of the plurality of portions of the encoded data to locate the data corruption.

14. The computer program product of claim 13 wherein performing an XOR-based trial process to compare the failure mask to a plurality of portions of the encoded data to locate the data corruption further includes:

performing the CRC operation on one or more of the plurality of portions of the core data to locate the data corruption.

15. A computing system including a processor and memory configured to perform operations comprising:

generating encoded data within a memory module, wherein generating encoded data includes:

performing a CRC operation on core data to generate CRC value, and performing an XOR operation on the core data and the CRC value to generate parity data; and decoding the encoded data to confirm integrity of the encoded data.

16. The computing system of claim 15 wherein decoding the encoded data to confirm the integrity of the encoded data includes:

generating a failure mask based, at least in part, upon the encoded data, and if the failure mask indicates data corruption, performing an XOR-based trial process to compare the failure mask to a plurality of portions of the encoded data to locate the data corruption.

17. The computing system of claim 16 wherein decoding the encoded data to confirm the integrity of the encoded data further includes:

if the failure mask does not indicate data corruption, performing a CRC-based corruption check to determine if the encoded data includes corrupt data.

18. The computing system of claim 16 wherein the plurality of portions of the encoded data were stored within a plurality of memory dies within the memory module.

19. The computing system of claim 15 wherein the core data includes metadata.

20. The computing system of claim 15 wherein the memory module includes one of:

a DDR 4 memory module;

a DDR 5 memory module; and a DDR 6 memory module.

*    *    *    *    *